United States Patent [19]

Niemanns

[11] Patent Number: 4,627,145
[45] Date of Patent: Dec. 9, 1986

[54] WINDOW GLASS MOUNTING ARRANGEMENTS

[75] Inventor: Gerd Niemanns, Grefrath, Fed. Rep. of Germany

[73] Assignee: Draftex Industries Limited, Edinburgh, Scotland

[21] Appl. No.: 610,597

[22] Filed: May 15, 1984

[30] Foreign Application Priority Data

May 20, 1983 [GB] United Kingdom ............... 8314079

[51] Int. Cl.$^4$ .................... B23P 11/02; E04B 1/62
[52] U.S. Cl. .................................. 29/450; 52/400
[58] Field of Search ............... 52/208, 397, 400, 403; 29/450

[56] References Cited

U.S. PATENT DOCUMENTS

| 3,189,143 | 6/1965 | Adams | 52/400 |
| 4,001,994 | 2/1977 | Williams et al. | 52/400 |
| 4,343,121 | 8/1982 | Kruschwitz et al. | 52/400 |
| 4,347,693 | 9/1982 | Kruschwitz | 52/208 |
| 4,483,113 | 11/1984 | Kruschwitz | 52/400 |

FOREIGN PATENT DOCUMENTS 2906934 9/1980 Fed. Rep. of Germany .
2132884 11/1972 France .
2031350 11/1980 United Kingdom .

Primary Examiner—Howard N. Goldberg
Assistant Examiner—Steven Nichols
Attorney, Agent, or Firm—Leydig, Voit & Mayer, Ltd.

[57] ABSTRACT

A mounting arrangement for a windscreen glass is shown. Around the top and sides of the windscreen opening, a rubber section is mounted on a bodywork flanged joint, the rubber having embedded in it a metal carrier which has an extension which emerges outside the plastics to provide an exposed stiff metal lip which partially embraces a recess holding mastic. The section of the mounting arrangement along the bottom of the windscreen opening differs in that its metal carrier does not have such extension or the exposed metal lip, and the plastics immediately beneath the recess has a slot into which a stiffening member can be clipped. The windscreen is mounted in position by sliding it upwardly in to the sides and top of the windscreen opening. The glass is thus trapped in position behind the exposed metal lip and sealed and adhesively secured by the mastic. It is then fixed in position in the section along the lower part of the windscreen opening by bending the base of the recess in that section downwards, pushing the glass into the mastic and allowing the rubber to resile upwards with a flap thereof making contact with the outside of the glass. The stiffening member is then replaced into position in the slot mentioned above.

11 Claims, 5 Drawing Figures

U.S. Patent  Dec. 9, 1986  Sheet 1 of 4  4,627,145

WINDOW GLASS MOUNTING ARRANGEMENTS

BACKGROUND OF THE INVENTION

The invention relates to window glass mounting arrangements, such as for use for example in motor vehicles.

BRIEF SUMMARY OF THE INVENTION

According to the invention, there is provided a window glass mounting arrangement, comprising first and second parts for mounting in respectively different positions around the window opening and respectively defining channel means for receiving the window glass, the channel means in the said first part being relatively stiff-sided requiring the window glass to be slid into position through the open mouth of the channel means, and the channel means of the second part having a flexible side which can be flexed to provide clearance for the window glass to enter the channel, means thereafter resiling.

According to the invention, there is also provided a window glass mounting arrangement, comprising flexible material defining a first part extending along at least a first side of the opening and a second part extending along a second side opposite the said first side, the flexible material of each said part defining, within each said part, a respective pair of first and second channels facing in opposite directions whereby the two said parts are mounted on the respective said sides of the window opening by placing the said first channel of each part onto, so as to embrace, a mounting flange or the like of the window opening so that the open mouths of the second channels face each other across the window opening, a respective metal carrier embedded in the flexible material of each said part, the metal carrier being positioned to embrace the first said channel thereof so as to assist the grip of that channel on the mounting flange or the like, the carrier of the said first part being extended through the flexible material so as to emerge therefrom and to be configured to provide external reinforcement for an external wall of the second channel of that part but the second channel of the second part having no such external reinforcement, whereby a window glass can be mounted in position by sliding it through the open mouth of the second channel of the first part, so that it is thereafter at least partly held in that channel by the said external reinforcement, the window glass being placed into the second channel of the second part by flexing a wall of that second channel.

According to the invention there is further provided a method of mounting a window glass in a window opening, comprising the steps of sliding the window glass in a first direction so that at least one edge of it slides through the open mouth of a first channel supported on at least one side of the opening and having relatively rigid sides, outwardly flexing one side wall of a second channel which is supported on the opposite side of the opening, thereby to provide clearance for the opposite edge of the window glass, moving that opposite edge transversely to the plane of the glass into the second channel through the clearance provided by the flexed side wall, and allowing the flexed side wall to resile onto the surface of the glass adjacent the said opposite edge.

DESCRIPTION OF THE DRAWINGS

Window glass mounting arrangements and methods according to the invention will now be described, by way of example only, with reference to the accompanying drawings in which.

DESCRIPTION OF PREFERRED EMBODIMENTS

Figure 1:
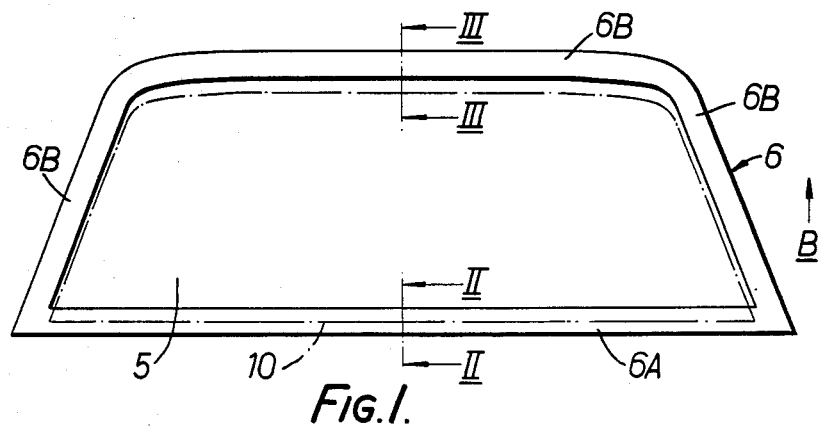
FIG. 1 is a diagrammatic front view of a windscreen opening on a motor vehicle and including one of the mounting arrangements.

FIG. 1 shows a diagrammatic front view of a windscreen or windshield opening 5 in a vehicle body. The opening 5 is defined in the bodywork by a bodywork flanged joint (shown in more detail in the other Figures) which extends around the opening and forms a mounting flange on which the windscreen mounting arrangement to be described is fitted. FIG. 1 shows the mounting arrangement 6, this comprising a part 6A along the bottom and possibly a short distance up each side of the opening and a part 6B which extends around the top and sides of the opening 5. The two parts 6A and 6B will be described in more detail below. Although they are of different form, as will be described, the two parts are preferably made into a complete "ring" by the manufacturer of the mounting arrangement and delivered to the vehicle assembler in this form, so that he then merely has to place the ring into position on the mounting flange around the windscreen opening and then insert the windscreen glass in a manner to be described.

Where the windscreen opening 5 has sharp corners, as shown in FIG. 1 at 8 and 10, mitred or other suitable joints are formed there.

Figure 2:
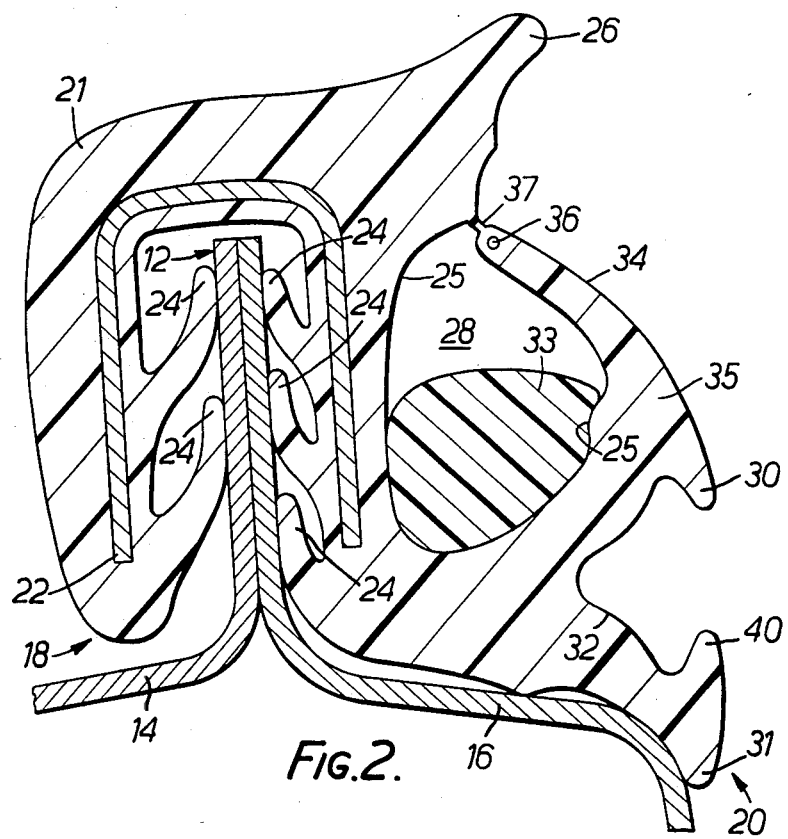
FIG. 2 is a cross-section on the line II—II of FIG. 1.

FIG. 2 shows a section on the line II—II of FIG. 1, that is, a section through the part 6A of the mounting arrangement.

This part comprises a gripping portion 18 and a mounting and sealing portion 20 which are made of integral plastics or rubber material 21.

The gripping portion 18 is channel-shaped in cross-section and has embedded in it a reinforcing carrier 22 of any suitable form. For example, the carrier may be made of metal and in the form of side-by-side U-shaped elements either connected together or entirely disconnected. Instead, it could be made of wire looped to and fro across the channel. Preferably, it is embedded in the material 21 by a cross-head extrusion process.

The material 21 is extruded so as to provide integral gripping lips 24.

The mounting and sealing portion is extruded so as to provide a generally ledge-shaped surface 25 having a lip 26 and a recess 28. In addition, it provides lips 30 and 31 defining a generally V-shaped slot 32.

Mastic 33 of any suitable form is positioned in the recess 28. A web-like flap 34 of thin flexible material is anchored to the surface 25 along an external edge thereof, at 35. Along its opposite edge, the flap 34 has beading 36 of any suitable form and is secured to the adjacent wall of the ledge-shaped surface 25 by a very thin membrane 37. Advantageously, the flap 34 is formed of the same material as the material 21 and is extruded integrally therewith, though this is not essential.

Figure 4:
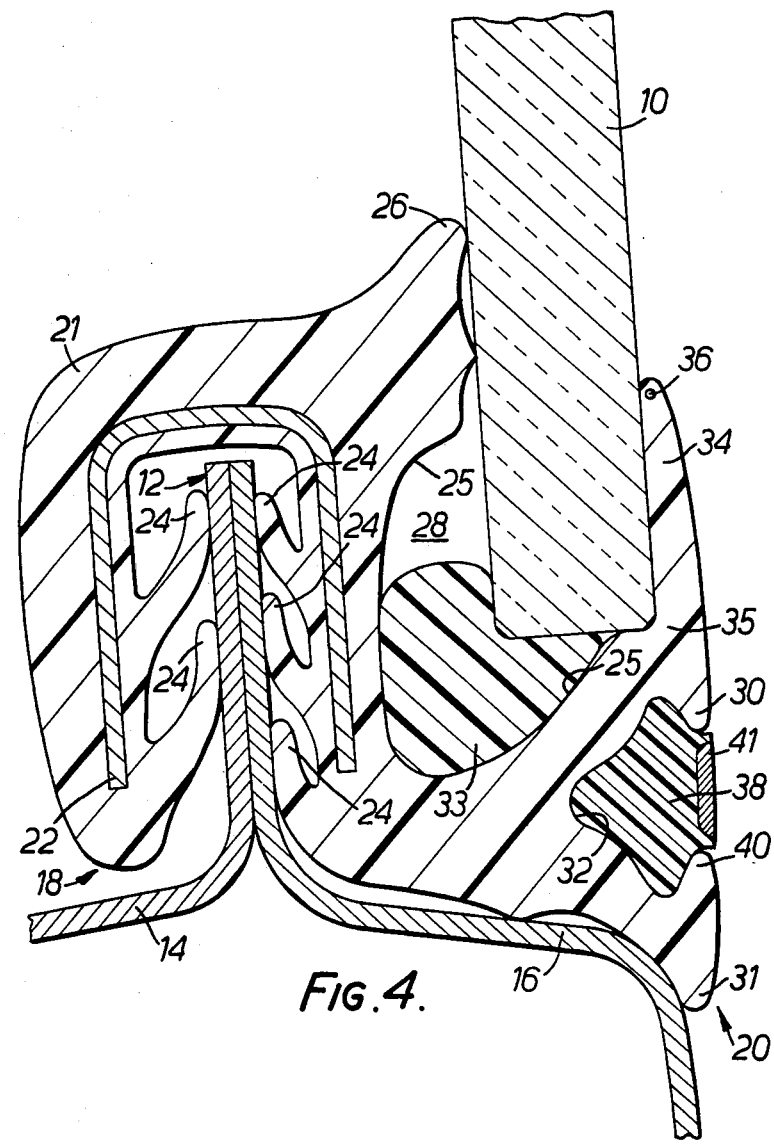
FIGS. 4 and 5 correspond to FIGS. 2 and 3 respectively but show a windscreen glass in position.

A stiffening member 38, made of relatively hard plastics or rubber material for example, is a close fit in the slot 32 and is locked therein by the lips 30 and 31 (see FIG. 4).

Figure 3:
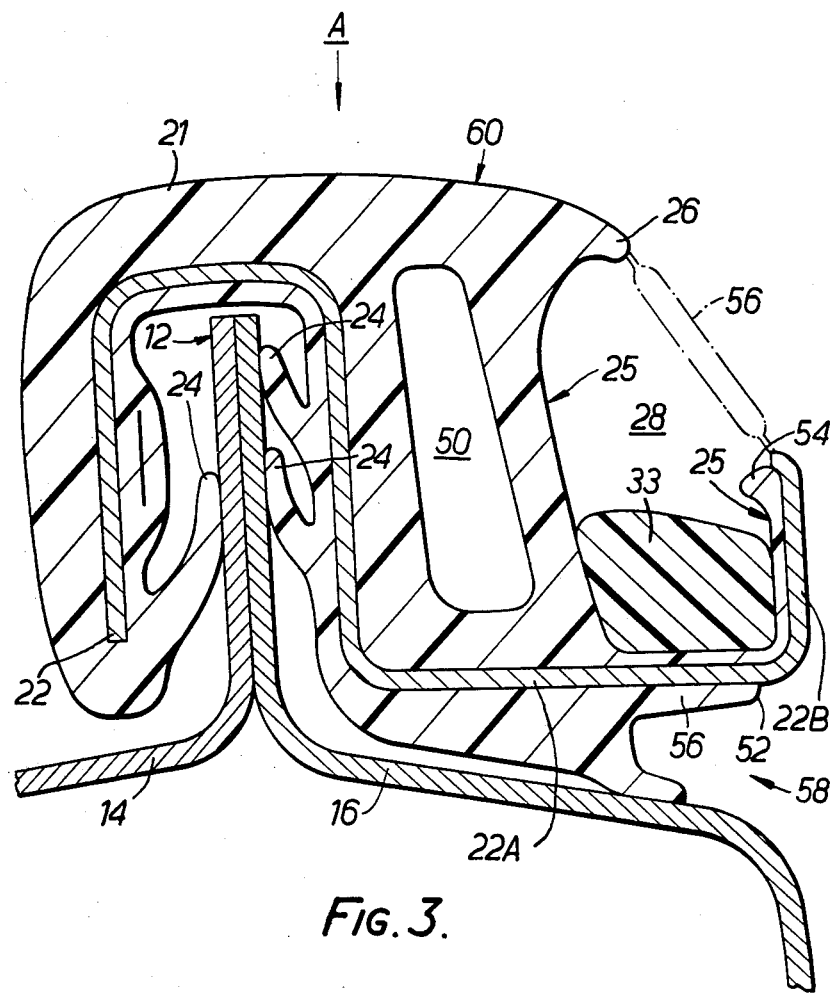
FIG. 3 is a cross-section on the line III—III of FIG. 1.

FIG. 3 shows a section on the line III—III of FIG. 1, that is, a section through the part 6B of the mounting arrangement. Parts in FIG. 3 corresponding to parts in FIG. 2 are similarly referenced. In fact, to aid comparison between FIG. 2 and FIG. 3, FIG. 3 is drawn in an inverted sense with reference to FIG. 2, that is, the arrow A points towards the top of the windscreen opening.

It will be apparent from FIG. 3 that the part 6B of the mounting arrangement differs from the part 6A in a number of respects.

First, the profile of the material 21 is somewhat different and defines a hollow tube 50 to increase its flexibility.

Secondly, there is no slot corresponding to the slot of FIG. 2.

Thirdly, in FIG. 3, the metal carrier 22 has an extension 22A which runs under the hollow tube 50 and the surface 25 and emerges at 52 to provide a stiff turned-up lip 22B. The lip 22B runs up and on the outside of a lip 54 formed in the material 21. The lip 22B is of course in the form of uncovered metal and may be suitably treated so as to provide a bright decorative trim.

The portion 54 differs from the flap 34 in FIG. 1 in that it does not extend across so as to close the recess 28. However, if desired the recess may be closed by a web shown dotted at 56.

The motor manufacturer fixes the mounting arrangement in position by placing the gripping portion 18 of each part 6A and 6B over a bodywork flanged joint 12 between body parts 14 and 16 and pressing it thereon so that it firmly grips itself in position, helped by the gripping and sealing lips 24.

Figure 5:
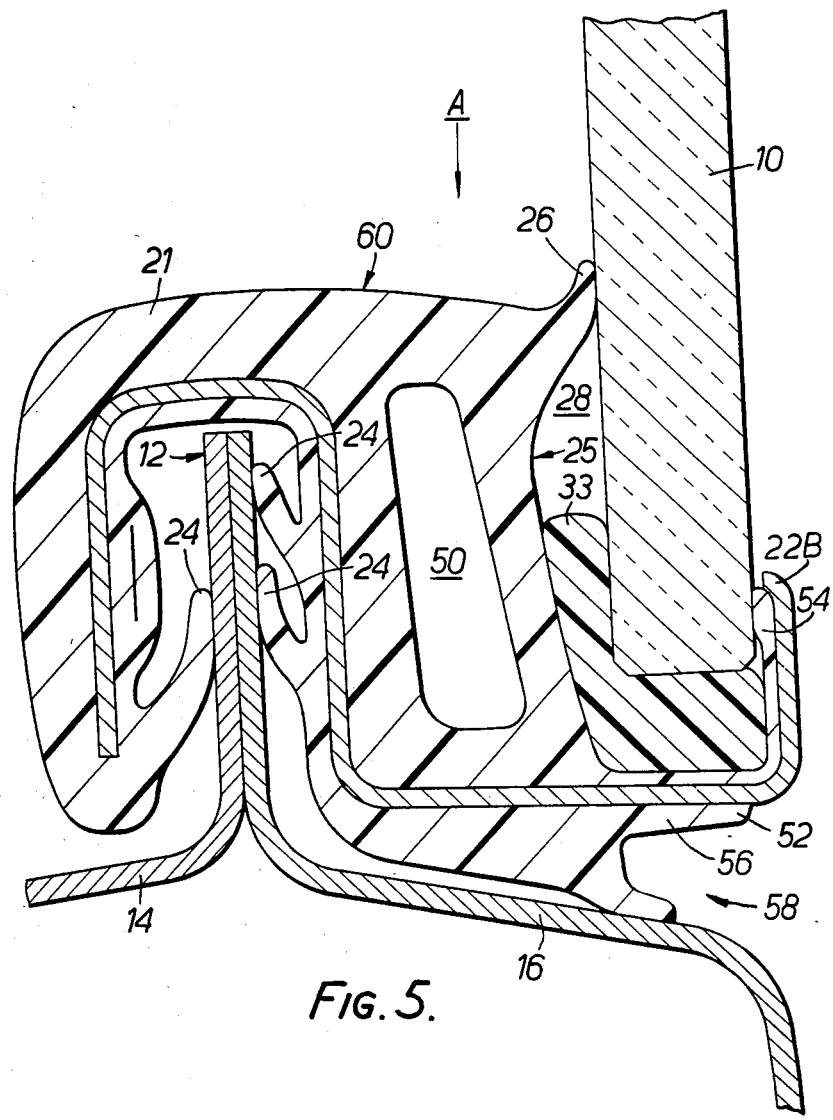

The manner in which the windscreen glass is fitted into position will now be described, with particular reference to FIGS. 4 and 5, FIG. 4 corresponding to FIG. 3 and showing the windscreen glass 10 in position in the part 6A of the mounting arrangement and FIG. 5 corresponding to FIG. 3 and showing the windscreen glass 10 in position in the part 6B.

The windscreen glass 10 is fitted into position by sliding it in an upward direction as shown by the arrow B in FIG. 1, that is, sliding it upwardly with respect to the opening 5. The outline of the windscreen glass 10 is shown dotted in FIG. 1 during the mounting process. During this mounting process, the stiffening member 38 (FIG. 4) is absent from the slot 32 of the part 6A (see FIG. 2) and the glass slides upwardly over the outside of the part 6A. As it continues to move upwardly, it is pushed into the recess 28 in the part 6B (see FIG. 5), thus entering behind the metal lip 22B and the lip 54, so that it comes into contact with the mastic 33 and finally assumes the position shown in FIG. 5. It will be appreciated, of course, that because FIG. 5 and FIG. 3 are drawn inverted with respect to the other Figures, the upwardly moving window glass 10 is moving in the direction of the arrow A shown in FIGS. 3 and 5.

Now that the glass is in position in the part 6B, the operator pulls the flap 34 of the other part, part 6A, outwardly by means of a suitable tool, tearing the thin membrane 37 (FIG. 4). Because the stiffening member 38 is not in position in the slot 32, the rubber defining the lower part of the surface 25 of the recess 28 can be bent downwardly into the open slot 32, thus enabling the flap 34 to be pulled outwardly of the glass 10, the latter then being pushed into the mastic 33 in the recess 28. The flap 34 is then allowed to resile onto the outside surface of the glass 10 as shown in FIG. 4, and thereafter the stiffening member 38 is pressed into position in the slot 32.

The glass 10 is now thus locked in position in the mounting arrangement. It is held in position in the part 6B by the mastic 33 and by being placed behind the stiff metal lip 22B. It is held in position in the part 6A again by the mastic 33 and also by the action of the flap 34 and the stiffening member 38. The exposed bright surface of the metal lip 22B of the part 6B enhances the appearance of the finished arrangement. The cut-away 56 shown in FIGS. 3 and 5 combines with the bodywork 16 to provide a recess 58 running along the windscreen opening to act as a water draining channel and also to help reduce the drag coefficient of the vehicle.

If desired, the surface 60 of the part 6B (see FIGS. 3 and 5) may be covered with textile trim.

Although the mounting arrangement has been described with particular reference to a windscreen or windshield opening, it is not of course restricted to such an application and may be used for mounting other window glass.

What is claimed is:

1. A window glass mounting arrangement, comprising first and second parts for mounting in respectively different positions on a mounting flange extending around a window opening and respectively defining channel means for receiving the window glass, the first part being mounted along at least one side of the window opening and the channel means in the said first part comprising flexible material having a rigid metal insert extending along the full length of the said at least one side and defining a first portion which embraces the said flange and a second portion which emerges from the flexible material to provide a rigid outside wall means of the channel means for requiring the window glass to be slid in position through the open mouth of the channel means of this part, and the second part being mounted along at least the opposite side of the window opening and the channel means of the second part having a flexible outside wall means for flexing outwardly to enable the window glass to be moved bodily sideways into the channel means in the said second part, the outside wall means of the second part thereafter resiling.

2. An arrangement according to claim 1, in which the said second part includes removable stiffening means which when removed enables the said flexing of the flexible side and when in position helps to resist such flexing.

3. An arrangement according to claim 2, in which the stiffening means comprises a slot defined adjacent the flexible side and a removable stiffening member for being received in the said slot.

4. An arrangement according to claim 1, including mastic for at least partially securing the window glass in the said channel means.

5. A window glass mounting arrangement, comprising flexible material defining a first part extending along at least a first side of the opening and a second part extending along a second side opposite the said first side, the flexible material of each said part defining, within each said part, a respective pair of first and second channels facing in opposite directions whereby the two said parts are mounted on the respective said sides of the window opening by placing the said first channel of each part onto, so as to embrace, a mounting flange or the like of the window opening so that the open mouths of the second channels face each other across the window opening, a respective metal carrier embedded in the flexible material of each said part and extending along the full length thereof, the metal carrier being positioned to embrace the first said channel thereof so as to assist the grip of that channel on the mounting flange or the like, the carrier of the first part being extended through the flexible material so as to emerge therefrom and to be configured to provide external reinforcement extending along the full length of an external wall of the second channel of that part but the second channel of the second part having no such external reinforcement, whereby a window glass can be mounted in position by sliding it through the open mouth of the second channel of the first part, so that it is thereafter at least partly held in that channel by the said external reinforcement, the window glass being placed into the second channel of the second part by flexing a wall of that second channel.

6. An arrangement according to claim 5, in which each said second channel includes mastic for sealing and adhering to the window glass.

7. An arrangement according to claim 5, in which the flexible material defining the second channel in the second part defines a slot adjacent to the external wall of that channel to allow clearance for flexing of that wall outwardly of the channel and subsequent resiling, and including a stiffening member positioning in the same slot to resist further flexing of the external wall.

8. A method of mounting a window glass in a window opening, comprising the steps of sliding the window glass in a first direction so that at least one edge of it slides through the open mouth of a first channel supported on at least one side of the opening and having relatively rigid sides, outwardly flexing one side wall of a second channel which is supported on the opposite side of the opening, thereby to provide clearance for the opposite edge of the window glass, moving that opposite edge transversely to the plane of the glass into the second channel through the clearance provided by the flexed side wall, and allowing the flexed side wall to resile onto the surface of the glass adjacent the said opposite edge.

9. A method according to claim 8, including the step of placing mastic inside the said channels to adhere to the glass.

10. A method according to claim 8, including the step of stiffening the flexed side wall of the said second channel, after it has resiled, so as to inhibit subsequent flexing.

11. An assembly for mounting a window glass in a window opening defined by a mounting flange running therearound, said mounting assembly comprising:

first means for engaging the window glass, said first means being mounted along the mounting flange of at least one side of the window opening and including a relatively rigid, up-turned means for defining a channel means having a relatively rigid external wall running for the length of the said at least one side, the channel means being for receiving one edge of the window glass in a first direction, the relatively rigid means having an integral part which embraces the mounting flange along the length of the said at least one side;

second means for engaging the window glass, said second means being mounted along the mounting flange on an opposite of the window opening and including a flexible channel wall means for flexingly receiving the opposite edge of the window glass in a second direction transverse to the first direction and resiling against the surface of the window glass; and means cooperatively arranged with the second engaging means for stiffening the resiled flexible channel wall means.

* * * * *